May 12, 1953 R. L. STURMER 2,638,113
AUTOMATIC SNAP-ACTING FLUID PRESSURE INFLATOR
Filed July 27, 1949 2 Sheets-Sheet 1
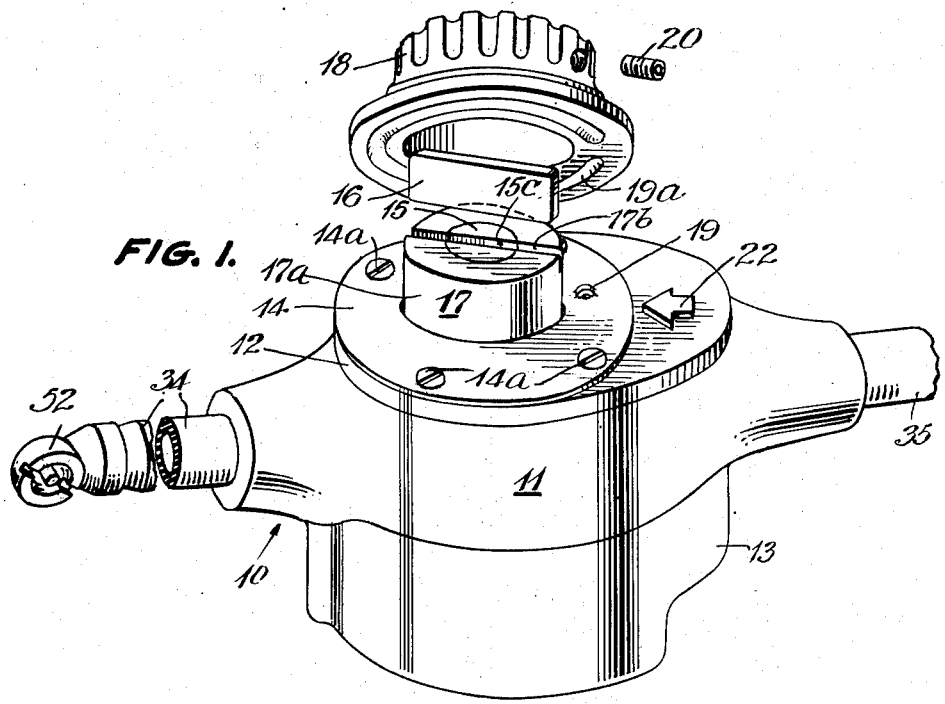
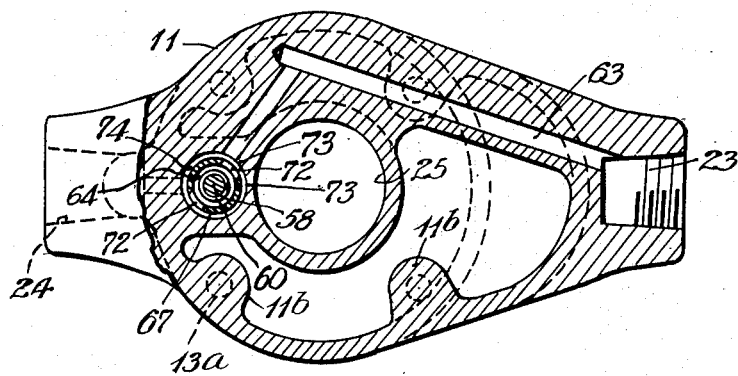
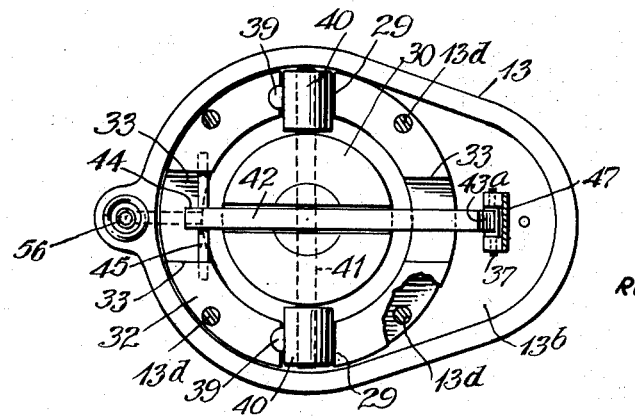
INVENTOR
ROBERT LEROY STURMER
BY Henry Gippord Hardy
ATTORNEY

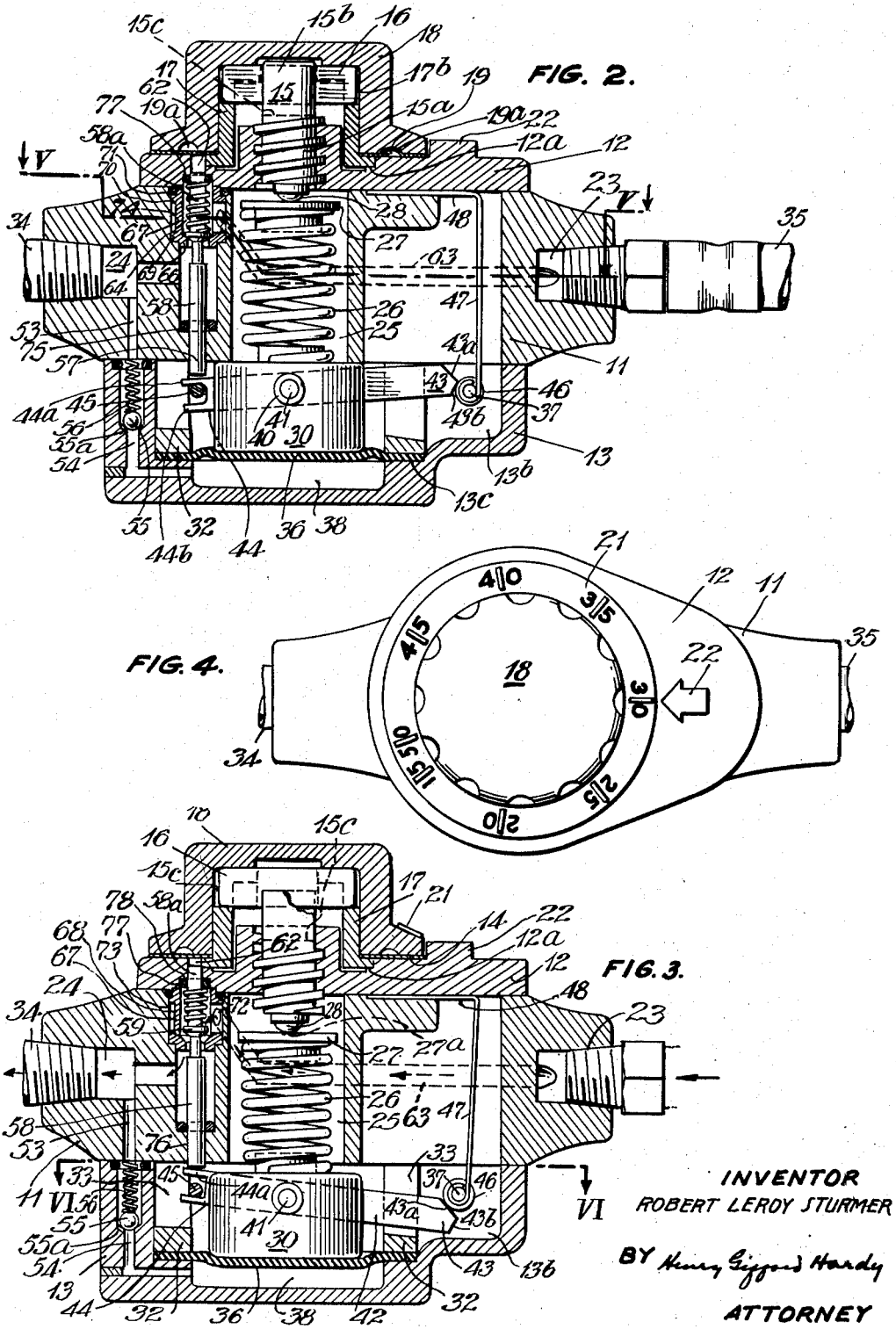

Patented May 12, 1953

2,638,113

UNITED STATES PATENT OFFICE 2,638,113

AUTOMATIC SNAP-ACTING FLUID PRESSURE INFLATOR

Robert Leroy Sturmer, San Leandro, Calif., assignor to Nelson Specialty Corporation, San Leandro, Calif., a corporation of California Application July 27, 1949, Serial No. 107,090

9 Claims. (Cl. 137—225)

My invention relates to improvements in automatic inflating devices for use with compressible fluids, and more particularly to improvements in quick acting automatic inflating devices of the single diaphragm type.

An important object of the invention is to provide an accurate, automatic, and quick acting inflating device of simplified design and single diaphragm construction.

Another object of the invention is to provide an accurate and automatic device for rapidly inflating vehicle tires which is adapted to be incorporated into a flexible pneumatic supply line and readily moved about therewith.

A further object of the invention is to provide a quick acting automatic inflating device for vehicle tires and the like which possesses improved accuracy and which is relatively quiet in operation.

Another object of the invention is to provide an accurate and quick acting automatic inflating device for use with compressible fluids which provides long filling strokes, and which can be adjusted easily to the desired pressure by the operator immediately prior to or during use.

A still further object of the invention is to provide an accurate and quick acting automatic tire inflating device which is readily portable and which can be readily adjusted to a predetermined pressure by the operator immediately prior to or during use.

Another object of the invention is to provide a light weight and readily portable automatic tire-inflating device which possesses improved accuracy and can be readily disassembled for cleaning and repair.

A further object of the invention is to provide an accurate and quick acting automatic device for inflating pneumatic tires to a predetermined pressure which maintains its calibration with continued use independently of normal variations in supply tank pressure.

It is another object of the instant invention to provide an accurate and quick acting automatic tire inflator of simple design, readily fabricated in quantity at a low unit cost.

Further objects are to provide a construction of maximum simplicity, economy and ease of assembly and disassembly, also such further objects, advantages and capabilities as will fully appear and as are inherently possessed by the device and the invention described herein.

Invention further resides in the combination, construction and arrangement of parts shown in the accompanying drawings and while there is shown therein a preferred embodiment thereof, it is to be understood that the same is merely illustrative of the invention and the invention is capable of modification and change and comprehends other details of construction without departing from the spirit thereof or the scope of the appended claims.

Referring to the drawings:

Figure 1 is a perspective view showing the automatic inflating device, with the dial cap and the key raised from the assembly to show their relative positions.

Figure 2 is a longitudinal vertical section showing the device of Figure 1 connected to a source of fluid under pressure with the valve closed and the dial set to a low value.

Figure 3 is similar to Figure 2, but shows the dial set to a high value and the control valve in the open condition.

Figure 4 is a top plan view of the device of Figure 1, showing the indicator dial.

Figure 5 is a sectional view of the central housing taken on the plane V—V in Figure 2, and looking in the direction of the arrows.

Figure 6 is a plan view of the bottom cover assembly which corresponds with the line VI—VI in Figure 3, and looking in the direction of the arrows.

Referring now more particularly to the drawings in which like reference numerals indicate like parts in the several views, an automatic device for inflating vehicle tires and the like is shown generally at 10. It involves three principal assemblies, one in the central casing or housing 11, the second in the top cover member 12, and the third in the bottom cover member 13. These three members are preferably die-cast from a suitable light metal alloy. The top cover 12, together with the retaining ring 14, are secured to the housing 11 by means of recessed screws 14a or in any other suitable manner for quick access or assembly. The bottom cover member 13 is secured to the under surface of the housing 11 by screws 13d which pass upwardly through holes 13a and engage threads in the internal bosses 11b of the housing.

The central portion of the top cover 12 is drilled and tapped to receive and engage the threads of the lower portion 15a of a short vertical shaft 15. The upper portion 15b of this same shaft 15 has a transverse slot 15c adapted to receive the floating key 16. Bushing 17 which is supported by the upper portion of the cover 12 and which surrounds the upper portion 15b of the shaft 15, is likewise provided with a transverse slot 17b so that when the key 16 is in place the bushing 17 and the shaft 15 rotate as a unit. Bushing 17 is rotatably supported within the annular recess 12a in the cover member 12 and retained therein by the ring 14 for free turning movement in a horizontal plane about the axis of shaft 15. Cap 18 fits as a bonnet over the ring 14 and over the exposed portions of the bushing 17 and shaft 15 when keyed together with key 16, and cap 18 is retained in position, adjustably, by set screw 20 which bears against the vertical cylindrical surface 17a of the bushing 17. Thus when the cap 18 is rotated, bushing 17 will rotate and the shaft 15 will also rotate and move either up or down on its threads 15a depending upon the direction of rotation. The flanged surface of the cap 18 carries a graduated scale 21 which coacts with the arrow or pointer 22 on the cover member 12. The cap 18 is not intended, under usual conditions, for unlimited rotation. Accordingly, stop 19 is provided on the surface of the retaining ring 14, which stop is adapted to guide in circular groove 18a formed in the under surface of cap 18, which groove is not completed between the lowest and highest dial readings thereby providing a barrier to 360 degree rotation.

The central housing 11 is provided with a vertical bore 25 substantially in axial alignment with shaft 15. A stiff compression spring 26 of relatively large diameter is retained within the bore 25. The upper end of spring 26 bears against and exerts an upward resilient pressure on the plug or cap 27. The ball end 28 at the inner terminus of the shaft 15 bears against a centrally disposed detent 27a in the upper surface of plug 27. In this manner the resilient pressure of spring 26 is transmitted to shaft 15. The lower end of spring 26 exerts a downward resilient pressure against the upper surface of the cylindrical diaphragm head 30.

The diaphragm head 30 is normally part of the lower or bottom cover assembly 13. The cavity in the bottom cover member 13 is substantially cylindrical except for the recess 13b, the bottom of the cavity being formed with a central depression having an annular shoulder 13c. The resilient diaphragm 36 rests on this shoulder 13c at its periphery, forming the chamber 38. The diaphragm 36 is retained in position on the shoulder 13c by the tubular bushing 32 which extends upwardly to abut against the lower face of the casing or housing 11. The bottom cover member 13, the diaphragm 36, and the tubular bushing 32 are maintained in position by the screws 13d which pass therethrough and engage threads in the bosses 11b of the central housing. The diaphragm head 30 rests upon the upper surface of the diaphragm 36, and is adapted for vertical movement within the tubular bushing 32. However, since the diameter of the head 30 is substantially greater than that of the vertical bore 25, its upward movement in opposition to the action of spring 26 is limited by the lower face of central housing 11. The diaphragm head 30 is slotted longitudinally of the device from its top for about three-quarters of its height, thus retaining a flat continuous lower surface for contact with the upper surface of the diaphragm 36. This longitudinal slot is adapted to receive longitudinal cam 42 which is held in position within the slot for pivotal movement in the vertical plane by a horizontal pin 41 which passes through the head 30 and the cam 42. The pin 41 extends beyond the head 30 on both sides thereof, and these ends are journalled in hardened loose cylindrical sleeves 40. These sleeves 40 ride in and engage a pair of relatively narrow vertical slots 29 cut transversely at diametrically opposed positions in the wall of the annular bushing 32 and the sleeves 40 preferably bear against hardened inserts 39 on the bearing face of each slot 29. A pair of relatively wide vertical slots 33 are also formed in the bushing 32 in a plane substantially at right angles to the slots 29 and the axis of pin 41, the slots 29 and 33 being disposed in quadrature arrangement. One end of the cam 42 is provided with a bifurcated yoke or fork 44, and is retained in limited free movement by transverse pin 45 extending across one of the slots 33, the diameter of pin 45 having a predetermined relationship to the distance between the upper and lower tynes of fork 44. The opposite end of cam 42 is provided with an upper beveled cam surface 43a and an oppositely and more sharply beveled lower cam surface 43b, the surfaces 43a and 43b being adapted to coact with the snap-spring roller 46 which rotates about a pin 37 carried by the free end of a relatively stiff leaf spring 47. The opposite end of spring 47 is supported upon the upper surface of the housing 11 as shown in Figure 2, and is retained in position when the upper cover plate 12 is attached. As indicated by the configuration of the cam surfaces 43a and 43b, more force is required to raise the end 43 of cam 42 from the lower position shown in Figure 3 to the position shown in Figure 2 than is required to depress the cam. Spring 47, being in constant contact with either one or the other of the cam faces 43a and 43b, continuously exerts a resilient pressure which causes the rollers 40 to bear against the hardened plate 39.

A bleeder passage 53 communicates from the outflow port 24 of the central housing 11 with passageway 54 in the bottom cover member 13 through a spring loaded check valve 55 having a by-pass or leakage passage 55a of predetermined size formed therein in such a manner as to impede or retard the equalization of the pressure in the chamber 38 with the pressure in the outflow port 24, whenever the outflow pressure in the delivery line 34 is increased. However, the check valve 55 quickly equalizes the pressure in chamber 38 with that of outflow port 24 whenever the pressure in chamber 38 is higher than the pressure in the delivery line 34 and the differential pressure is sufficient to overcome the resistance of the valve spring 56. (N. B. Passage 54 leads directly to chamber 38.)

When the snap-acting cam 42 is in the raised position illustrated in Figure 2 wherein the roller 46 is in contact with the lower cam surface 43b and retained there by the resilient action of spring 47, the upper tyne of the fork 44 bears downwardly in contact with the pin 45 and out of engagement with the lower end 57 of the valve stem 58. A decrease in the pressure in chamber 38 of a sufficient value will permit the spring 26 to move the head 30 downwardly and with it pin 41 so that the cam 42 is caused to move past dead center and to its lower position, which is illustrated in Figure 3, wherein the roller 46 is brought into contact with cam surface 43a. In this position the lower tyne of the fork 44 moves into contact with the pin 45, causing the fork member 44a to bear against the lower end 57 to unseat the valve 59 from substantial fluid-tight sealing engagement with the member 61, and in opposition to the action of the valve spring 60. In this manner, the valve 59 is opened to a predetermined value determined by the clearance between the pin 45 and the fork members 43a and 43b.

Valve seating member 67 has a hollow cylindrical body 68 having formed integrally therewith an inner sealing ring 66 and the parallel and spaced apart outer peripheral rings 69 and 70. The upper surface of the outer ring 70 forms a shoulder for supporting an O-ring seal 71 at the top of the member 67, and extending transversely through the body 68 thereof between the outer rings 69 and 70 is one or more air inlet holes 72. When the member 67 is inserted and seated within a vertical bore 73 drilled in the upper portion of the central housing 11, the annular space bounded by the body 68, the bore 73, and the rings 69 and 70 forms an outer fluid chamber 74. Thus, pressurized fluid from the supply line 35 passes from the inflow port 23 through the passageway 63 in the central housing 11 into the outer chamber 74, which communicates with the interior chamber 64 within the seating member 67 through the holes 72. An O-ring seal 75 is placed around the lower portion of the valve stem 58 before the lowermost end 57 thereof is inserted through a hole 76 counter-bored in the lower portion of the housing 11 with its axis substantially in alignment with the axis of vertical bore 73. After the valve stem 58 has been lowered sufficiently to move the valve 59 into seating engagement with the seat 66, the valve spring 60 is installed on the upper portion 58a of the valve stem so that the lower end of the spring presses downwardly on the valve 59 and the opposite end of spring 60 exerts upward resilient pressure on an O-ring seal 77 contained within the cylindrical recess 78 in the lower face of the top cover. This cover 12 has a vertical hole 62 counter-bored therein in such a manner as to slidably receive the upper end 58a of the valve stem as the valve 59 moves to the open position, and this hole 62 communicates with the atmosphere through clearance between the retainer ring 14 and the housing 11. The respective upper and lower portions 58a and 57 of the valve stem are of substantially the same diameter, and the upper stem 58a is retained in sealing engagement at all times with an O-ring seal 77 which is substantially the same size as the seal 75 which forms a sealing engagement with the lower portion 57 of the valve stem. Thus, it will be apparent that the valve stem 58 is pressure balanced between the lower seal 75 and the upper seal 77 whenever the valve is open, and is also pressure balanced between the upper and lower ends of the inner chamber 64 whenever the valve is in the closed position. Because of this pressure balance in both the open and closed positions of the valve 59 and valve stem 58, the operation thereof is substantially independent of compressor or supply line pressure fluctuations which may normally be expected to occur during tire inflating operations or recharging of the air storage tank. Whenever the valve stem 59 is moved to its raised position by the action of cam 42 and yoke 44, a predetermined volume of pressurized fluid is permitted to flow from the inflow port 23 through the passage 63, into valve chamber 64, through the valve 59, and into the outflow connection 24 and the delivery line 34.

Operation

In operation, the in-flow port 23 is connected by a flexible hose 35 to a source of compressed air under a pressure preferably 30 pounds or more per square inch greater tnan the pressure to which the tire is to be inflated, and the outflow port 24 is connected to a relatively short delivery supply line 34, the free end of which contains a delivery chuck or valve 52 which is adapted to be removably connected to the valve stem of a pneumatic tire or other inflatable receiver. The graduated scale 21, which preferably is calibrated in pounds per square inch, is turned about its vertical axis so as to indicate the desired tire pressure opposite the fixed pointer 22, thereby adjusting the downward pressure exerted by the stiff spring 26 on the head 30 and its supporting diaphragm 36 to a predetermined value. Under conditions wherein the delivery line 34 is placed in communication with a tire or other pressure vessel, the pressure of the line 34 and the chamber 38 will be equalized with that of the vessel, through the passage 53 and the check valve bypass 55a. Whenever pressure in the chamber 38 is lower than the pressure indicated by the dial 21, the resilient action of the stiff spring 26 pressing downwardly on the diaphragm head 30 moves the head and its supporting diaphragm 36 downwardly together with the central portion of the cam 42 which is pivotally supported by the pin 41. Since the fork 44 is restrained in its vertical movement in a predetermined manner by the horizontal pin 45 carried by the fixed bushing 52, the free end of the cam 42 is caused by the vertical movement of the central cam portion to move past dead center so that the cam 42 comes to rest in its lowermost position wherein the cam surface 43a is in engagement with the snap spring roller 46, as shown in Figure 3. This snap or toggle action of the cam 42 about the pin 41 as an axis brings the fork member 44a into contact with the lower end 57 of the valve stem 58 so as to raise the stem and unseat and open the valve 59 a predetermined distance determined by the vertical movement of the yoke 44. The opening of the valve 58 permits pressurized air to flow from the valve chamber 64 downwardly past the valve 58 and into the tire through the passage 66 and the delivery hose 34. The increased pressure which is thereby developed in the outflow port 24 causes back pressure to flow through the passage 53, slowly past the check valve 55 at a rate primarily determined by the size of the leakage passage 55a, and into the chamber 38 causing the diaphragm 36 to move the head 30 and pivotally connected cam 42, upwardly past the dead center position, with the result that the cam 42 comes to rest in its initial position illustrated in Figure 2 wherein the lower cam surface 43b is in engagement with the snap-ring roller 46, at which time the upper tyne of the fork 44 again moves into contact with the fixed pin 45. During this quick acting toggle movement of the cam 42, the downward motion of the fork 44 permits the valve stem 58 to be lowered by the valve spring 60 to quickly close the valve 59 and thereby interrupt communication between the delivery hose 34 and the high pressure supply line 35. Upon closure of the valve 59, the pressure in the delivery line is rapidly dissipated into the tire, and the ball check valve 55 permits the pressure in the chamber 38 to quickly balance with the pressure in the tire.

Thus, it will be seen that successive cycles or pulsations will be initiated by the diaphragm actuated cam 42 as long as the tire pressure is below the desired value and until pressure equilibrium conditions have been established wherein the pressure in the tire and in the diaphragm chamber 38 is substantially equal to the predetermined downward resilient pressure of the spring 26 which corresponds with a particular setting of the indicator dial 21. As soon as the desired tire pressure has been attained, and the pressure in the tire and in the chamber 38 is substantially equal to the pressure indicated by the dial 21, the cam 42 will be retained in its raised position above the roller 46 as illustrated in Figure 2, and no further pulsations of the device will occur, thereby indicating to the operator that automatic inflation of the tire has been completed.

I claim:

1. In automatic apparatus for dispensing pressurized fluids, the combination which comprises a chamber adapted to continuously receive fluid from a high-pressure source, a valve in said chamber having means normally biasing said valve in the closed position, and out-flow passageway adapted to be placed in communication with the said chamber whenever the said valve is in the open position, a diaphragm forming an expansible chamber responsive to variations in pressure in the said out-flow passageway, floating snap-acting means including a snap spring and a cam supported on said diaphragm, primarily controlled by the expansion and contraction of the said expansible chamber and adapted to open and to permit closing of the said valve, and adjusting means operable to exert a set resilient pressure on the said floating snap-acting means in opposition to the action of the said expansible chamber.

2. In automatic apparatus for dispensing pressurized fluids, the combination which comprises a chamber adapted to continuously receive fluid from a high-pressure source, a pressure balanced valve in said chamber having means normally biasing said valve in the closed position, an out-flow passageway adapted to be placed in communication with the said chamber whenever the said valve is in the open position, a diaphragm forming an expansible chamber responsive to pressure variations in the said out-flow passageway, and connected thereto through a flow-restricting opening, snap-acting means including a snap spring and a cam supported on said diaphragm, primarily controlled by the expansion and contraction of the said expansible chamber and adapted to actuate the said valve, and adjustable calibrated means operable to exert a downward set pressure on the said diaphragm supported snap-acting means in opposition to the action of the said expansible chamber.

3. In automatic apparatus for dispensing pressurized fluids, the combination which comprises a source of fluid under pressure, a chamber in communication with the said fluid-pressure source, a pneumatically balanced valve means in said chamber operable to open and close substantially independently of normal fluctuations in the pressure of the said fluid source and having means normally biasing said valve in the closed position, a delivery conduit adapted to be connected with an inflatable receiver and to receive fluid under pressure from the said chamber when the said valve is in the open position, an expansible chamber having a pressure-sensitive diaphragm, means communicating said chamber with said delivery conduit including a valve allowing relatively free and rapid passage of fluid from the chamber to the delivery conduit and relatively slow passage of fluid in the opposite direction, snap-acting means including a snap spring and a cam supported on said diaphragm, controlled by the expansion and contraction of the said diaphragm and adapted to actuate the said valve, and means adjustable externally of said housing and operable to exert a downward resilient pressure on the snap-acting cam in opposition to the pressure exerted on said diaphragm in the said expansible pressure chamber.

4. In automatic apparatus for dispensing pressurized fluids, the combination which comprises a chamber adapted to receive fluid from a high-pressure source, a pneumatically balanced valve in said chamber having means normally biasing said valve in the closed position, a delivery conduit adapted to be connected with an inflatable receiver and to be placed in communication with the said chamber, an expansible chamber having a pressure-sensitive diaphragm, means communicating said chamber with said delivery conduit including a valve allowing relatively free and rapid passage of fluid from the chamber to the delivery conduit and relatively slow passage of fluid in the opposite direction, snap-acting means including a snap spring and a cam pivotally supported on a diaphragm head, primarily controlled by the expansion and contraction of the said diaphragm in such a manner as to actuate the said valve, means operatively connecting said snap-acting means and valve, and adjustable means operable to exert a predetermined downward resilient pressure on the said diaphragm head tending to oppose the upward movement of the said diaphragm.

5. Automatic inflating apparatus comprising an air inlet, an air outlet, means connecting the same for passage of air from the inlet to the outlet, a normally closed valve disposed in said connecting means for normally closing communication between the inlet and outlet, pressure responsive means communicating with said outlet, valve operating means mounted on, supported and operated by said pressure responsive means to open said valve when the pressure in the outlet is less than a set value, calibrated means for adjusting said pressure responsive means to change the said set value and snap-acting means including a snap spring and a cam supported on said diaphragm, for quickly operating said valve operating means.

6. Automatic inflating apparatus comprising an air inlet, an air outlet, means connecting the same for passage of air from the inlet to the outlet, a normally closed valve disposed in said connecting means for normally closing communication between the inlet and outlet, pressure responsive means communicating with said outlet, valve operating means in the form of a lever carried by and pivoted on said pressure responsive means for movement therewith, one end of said lever being in operative relation to said valve for opening the same by pivotal movement in one direction and to allow closing of the same by pivotal movement in the other direction, the other end of said lever having cam surfaces and resilient means for bearing against said cam surfaces to quickly operate said lever by snap action both to open and to permit closing of said valve.

7. Automatic inflating apparatus comprising an air inlet, an air outlet, means connecting the same for passage of air from the inlet to the outlet, a normally closed valve disposed in said connecting means for normally closing communication between the inlet and outlet, a pressure responsive diaphragm communicating with said outlet and directly responsive to the pressures thereof, valve operating means including a pivotally mounted lever carried by said pressure responsive diaphragm for movement therewith, one end of said lever being in operative relation to said valve for opening the same by pivotal movement in one direction and to allow closing of the same by pivotal movement in the other direction, the other end of said lever having divergent cam surfaces, and resilient means for bearing against said cam surfaces for quickly operating said lever by snap action as it passes from one of said surfaces to the other.

8. In automatic apparatus for dispensing pressurized fluids, the combination which comprises a casing having a central bore, a separated inner chamber in said casing having valve means therein operable to control the pulsating flow of pressurized fluids through said chamber, an inflow connection for the said chamber, an outflow connection for the said chamber, a diaphragm across said central bore forming a fluid pressure chamber communicating with said outflow connection, a snap spring in said casing, means supported on said diaphragm including snap acting cam means coacting with said snap spring, responsive in a predetermined manner to the pressure at the said outflow connection and operable to control the action of said cam means to move the said valve from a normally closed to a predetermined open position, and means adjustable externally of said housing for exerting a set downward resilient pressure on the said diaphragm and diaphragm supported means.

9. In automatic apparatus for dispensing pressurized fluids, the combination which comprises a casing having a central bore, a separate inner chamber in said casing adapted to be placed in communication with a source of fluid under pressure, a valve in said chamber having means biasing said valve to closed position and operable to intermittently communicate the said chamber with an outflow connection, a diaphragm forming a fluid pressure chamber in said bore communicating with said outflow connection, a snap spring in said casing, a member supported by said diaphragm carrying snap acting cam means coacting with said snap spring, responsive in a predetermined manner to the pressure at the said outflow connection and operable to control the action of the said cam means to move the said valve from a normally closed to a predetermined open position, and means adjustable externally of the housing for exerting a set downward resilient pressure on the said diaphragm supported member and said diaphragm.

ROBERT LEROY STURMER.

References Cited in the file of this patent

UNITED STATES PATENTS

| Number | Name | Date |
|---|---|---|
| 1,618,953 | Penn | Feb. 22, 1927 |
| 1,770,912 | Clapp | July 22, 1940 |
| 1,861,916 | Hennebohle | June 7, 1932 |
| 1,918,341 | Knaak | July 18, 1933 |
| 2,294,702 | Van Der Werff | Sept. 1, 1942 |
| 2,344,256 | Lyons et al. | Mar. 14, 1944 |